April 19, 1960   P. LACHAIZE   2,933,029
FINDER FOR PHOTOGRAPHIC CAMERAS
Filed July 18, 1957   2 Sheets-Sheet 1
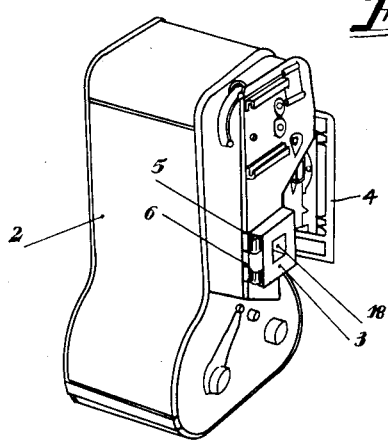
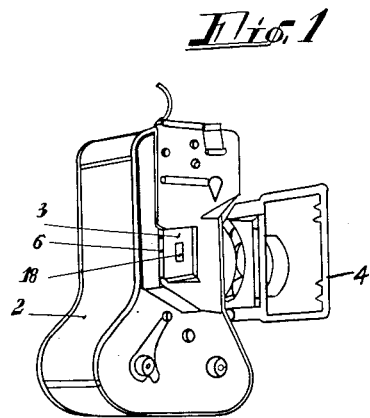
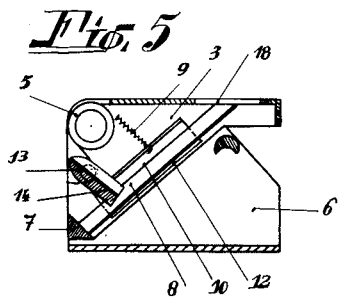
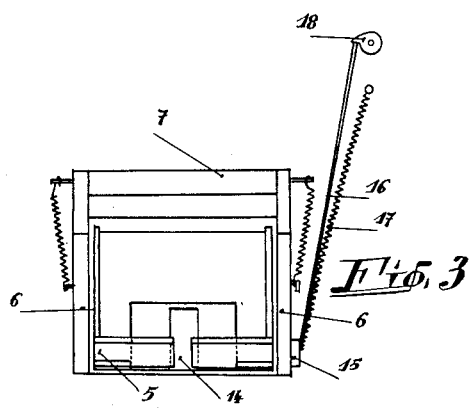
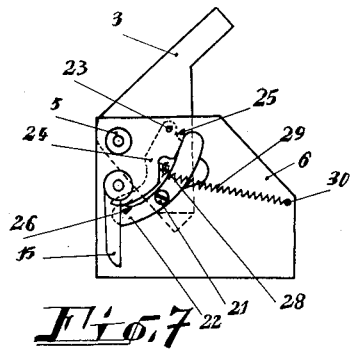
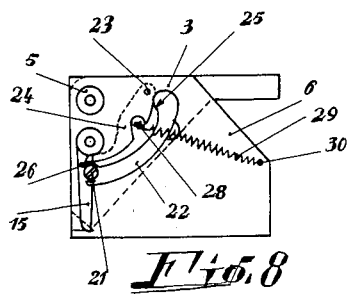

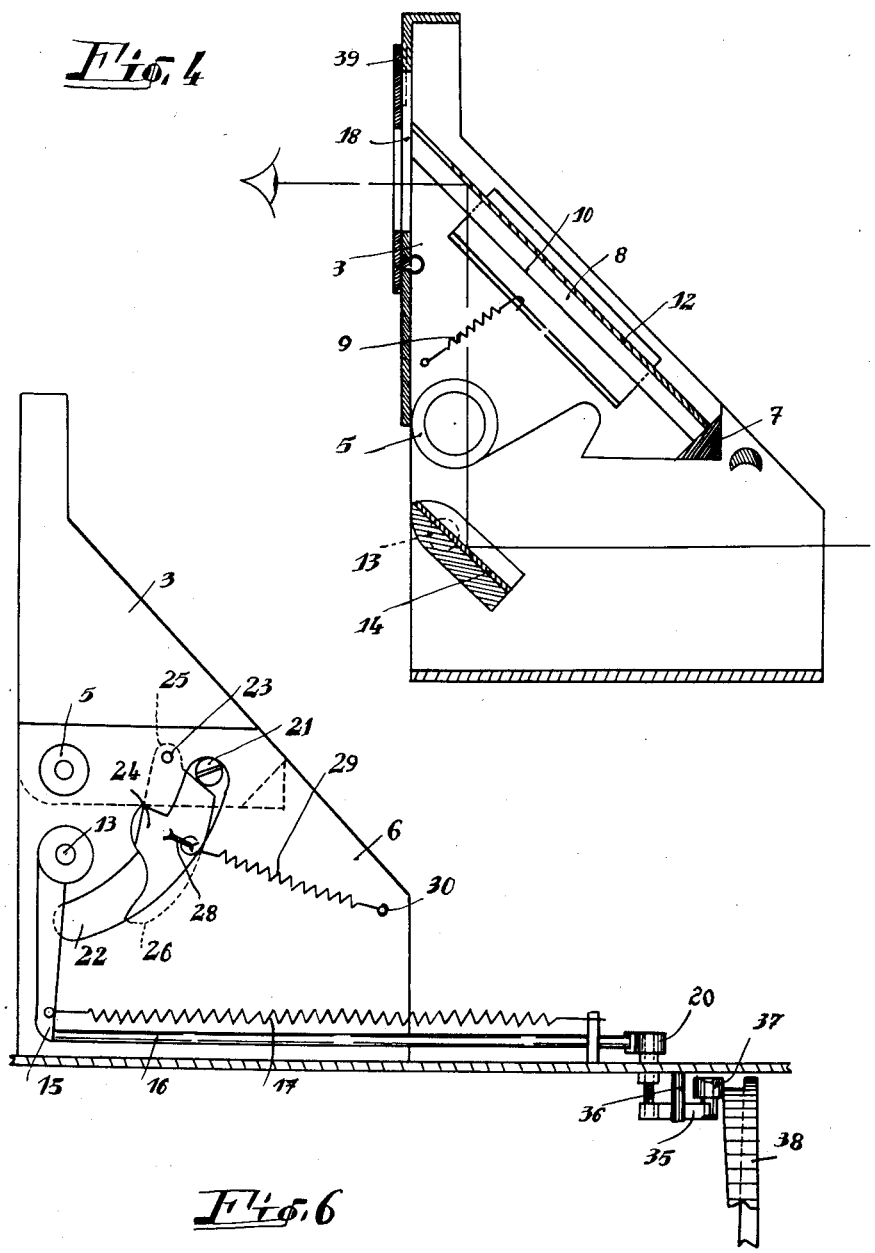

2,933,029
FINDER FOR PHOTOGRAPHIC CAMERAS

Paul Lachaize, Tassin-la Demi-Lune, France

Application July 18, 1957, Serial No. 672,771

Claims priority, application France July 23, 1956

3 Claims. (Cl. 95—44)

Although they make focusing easier by providing a direct viewing through a sight and a frame without any intermediate lens, the so-called iconometric or direct-view finders are however used only to a comparatively reduced extent in photographic cameras, on the one hand by reason of their bulk and on the other hand by reason of the fact that they are never associated with range finders. When the camera is provided with a range finder, the latter is consequently independent of the finder.

There exists however an auxiliary which may be fitted on certain cameras and which includes in combination a direct view finder and a range finder adapted to be secured to the camera in proximity with the finder frame. This auxiliary is however very bulky and cannot be incorporated with cameras having a selectively interchangeable objective.

In order to cut out these drawbacks, my invention has for its object a direct view finder which is equipped with a range finder and includes in combination with the field-defining frame a sight both for focusing in association with the range finder and for the actual finding, a mirror carrying a semi-transparent sheet of aluminum facing said field-defining frame and the area of which is sufficient to allow examination of the entire picture seen through the frame and a small range finder mirror adapted to move in a plane perpendicular to the axis of the objective, means being provided for the folding of the whole system so that the sight may be urged against the wall of the camera, the field-defining frame being designed so that it may be collapsed against the objective carrier.

According to a preferred embodiment of said direct view finder, the sight is adapted to pivot round an axis parallel with the wall of the camera and it is secured to the latter through the agency of a small frame while the partly reflecting mirror is arranged in a plane at 45° with reference to the plane of the actual sight, and the movable mirror of the range finder is carried by a spindle which is controlled by the objective carrier and is located with reference to the optic axis of the sight in a manner such that during the folding of the sight in a direction parallel with the wall of the camera, the partly reflecting mirror lies behind the small mirror of the range finder, elastic means being provided for locking the sight respectively in its open and in its closed position.

This locking of the sight in its open position forms an important feature of my improved finder. It is as a matter of fact essential that, during its period of use, the sight occupies an unvarying position and that, consequently, in no case the angle formed by the mirrors may be modified fortuitously which would lead to a misadjustment of the camera.

To this end, the sight carries on each of its side walls a projection engageable by a small lever which is pivotally secured to the frame carrying the sight and which is subjected to the action of the powerful spring which urges it into engagement with said projection, said lever being provided at each end with a notch which ensures, in association with an arcuate stud-guiding groove provided in the two flanges of said sight-carrying frame, the clamping of said projections between the ends of the grooves and the notches in the levers.

The field-defining frame of this finder may obviously be designed in any suitable manner. However, it is of necessity carried by the objective carrier, so as to progress with the latter for correction of the view-taking angle, and it includes two sections sliding with reference to each other firstly in an automatic manner for correction of parallax and secondly positively for the folding of the frame.

At any rate, my invention will be readily understood starting from the following description, reference being made to the accompanying diagrammatic drawings illustrating by way of example and by no means in a limiting sense a preferred embodiment of my improved direct view finder. In said drawings:

Figs. 1 and 2 are perspective views of the arrangement fitted on the camera respectively in its position of use and in its inoperative position.

Fig. 3 is a plan view from above on an enlarged scale, the finder being open and the semi-transparent mirror being removed.

Figs. 4 and 5 are longitudinal sectional views showing the semi-transparent mirror respectively in its open and in its closed position.

Figs. 6, 7 and 8 are elevational views from the side carrying the lever actuating the small mirror of the range finder, showing the arrangement respectively in its open position, during its closing and in its closed position.

In Figs. 1 and 2, 2 designates a photographic camera to one side wall of which is secured my improved direct view finder. This finder includes chiefly a sight 3 and a field defining frame 4.

The sight 3 made of stamped sheet metal is pivotally secured through the spindle 5 to the small frame 6 which is screwed onto a wall of the camera. The sight 3 includes two side walls or flanges having a triangular outline, the apices of which are interconnected through a short cross-member 7 and it is provided on the inner wall of each of said side walls or flanges with a small fitting 8 which is subjected to the thrust exerted by a spring 9 and defines with a small bar 10 a slideway inside which is fitted a mirror 12 having a rectangular outline and carrying a semi-transparent coat of alumina.

The flanges of the carrier frame 6 carry in addition to said spindle 5 to which the sight is pivotally secured another spindle 13 to which is keyed a small mirror 14. To one end of said spindle 13 is keyed a lever 15 controlled, through the agency of a rod 16 and of a spring 17, by a small cam 20, the angular shifting of which is controlled by the progression of the objective carrier, so that this progression may lead in a conventional manner to an angular shifting by a limited amount of the small mirror 14. The control of said cam 20 is obtained by any conventional means such as that illustrated in Fig. 6, and which forms a very accurate speed reducing system: a cam 38 which is rigid with the rotary carrier for the camera objective acts directly on a cam follower 37. The latter is carried by a short lever 35 coaxially rigid with the cam 20. The stop 36 is operative only when the objective is being changed so as to prevent an exaggerated movement of the lever 35 and thereby of the roller 37.

It should be remarked that the sight 3 and the small mirror 14 may, if desired, be pivotally secured around the same spindle.

In its operative position as illustrated in Figs. 1, 3, 4 and 6, the transiently stationary mirror 12 is located in a plane at 45° with reference to the wall of the camera 2 and with reference to the gate 18 of the sight 3.

In its non-operative position, the sight is in contradistinction collapsed into a position parallel with the wall of the camera as illustrated in Figs. 2, 5 and 8 for which position the sight has rocked bodily round the spindle 5 in a manner such that the mirror 12 has been shifted partly behind the small mirror 14.

In order to lock the sight in its open and closed positions and more particularly in its open operative position, the following locking means are provided. Each flange of the sight carries a projection of hardened steel 21 which is shifted, during the passage of the sight from one position into another inside an arcuate groove 22 provided inside the corresponding flange of the stationary frame 6. To said stationary flange is pivotally secured through a spindle 23, a small lever 24 forming for the projection 21 an arcuate slideway and terminating at its upper end in the shape of a notch 25 and at its lower end in the shape of a small rectilinear sloping section 26 shifted inwardly with reference to the arc of a circle formed by the major remaining part of the length of said lever 24. The latter is subjected at 28 to the tractional stress exerted by a spring 29 engaging at 30 the flange of the frame 6.

Assuming the sight 3 occupies an intermediate position between its open and closed positions as illustrated for instance in Fig. 7, the shifting of said sight through its rocking round the spindle 5 is performed readily since the two projections 21 slide freely over the two levers 24.

If the sight is now collapsed completely into its closed position as illustrated in Figs. 2, 5 and 8, there arrives a moment at which its projection 21 passes off the arcuate portions onto the rectilinear portions 26 of the levers 24. The springs 29 exert then on said levers tractional stresses which urge the projections 21 into the lower ends of the groove 22. This leads to a locking which is sufficient in the case of the closed position for which a comparatively large force should not be required when the operator wishes to raise the sight 3.

The case is different in the case of the open position for which the sight is to be held fast in a very rigid manner, so that the operator, when using the finder, may not shift the plane of the sight and thereby the plane of the mirror 12 with reference to that of the mirror 14. It should be remarked that in spite of the reliable locking provided for this open operative position, the closing may yet be obtained readily since it is then sufficient for the operator to depress the sight.

This locking illustrated in Fig. 6 is obtained through engagement of the projections 21 between the bottom of the grooves 22 and the notches 25 in the levers 24 which are energetically drawn into position by the springs 29.

The field defining frame 4 used with the sight of the iconometric finder is positioned in the conventional manner on the objective carrier and it is designed so as to be collapsed into contacting relationship with the latter when not in use, as clearly shown in Fig. 2.

It should be remarked that the semi-transparent mirror 12 is readily interchangeable. It is sufficient as a matter of fact to remove the gate from the sight so as to shift the mirror 12 out of its slideway constituted by the bars 10 and the flanges of the fittings 8, whereby an easy replacement is allowed. This possibility allows not only the operator to change the mirror, when broken, but also to clean it and in fact to do away with it transiently, if he prefers not using a range finder.

It is apparent that, in the operative position of the sight shown in Fig. 4, the operator looking through the gate 18 will see the exact picture covered by the objective through the mirror 12 and the frame 4 carried by the objective carrier, and defining the beam of view taking with the gate 18. At the same time, the narrow range finding beam is defined by the visual rays passing through the gate 18 and reflected on the two mirrors 12 and 14. This forms a small range finding spot controlled by the cam 20 and, consequently, by the location of the objective, said spot being superposed for the operator over the picture seen through the frame. It should be remarked that this combination of mirrors is entirely collapsed when not required for use within the bulk of the camera.

On the other hand, the frame 4 carried by the objective carrier is advantageously constituted by two members lying in the same plane which may be collapsed inside one another or else folded back over the camera, as illustrated in Fig. 2. It is also of advantage to make the frame members move automatically towards and away from the objective axis to take into account the modifications in parallax for the different focusing positions between the finder and the view taking means.

What I claim is:

1. A combined direct view finder and telemeter for photographic cameras provided with means for shifting the objective along its axis, comprising a finder frame including two parallel flanges hingedly secured to the camera to pivot round an axis perpendicular to the objective axis between an operative terminal position and a collapsed terminal position, guides rigid with the camera in planes perpendicular to the last-mentioned axis, provided with arcuate grooves coaxial with said pivotal axis and between which the finder frame flanges are held during the pivoting movement of the finder frame, a small mirror pivotally secured to the camera round an axis adjacent the pivotal axis of the finder frame and parallel therewith, means controlled by the shifting of the objective to produce a slight tilting movement of the small mirror round its axis as a function of the shifting of the objective, a semi-transparent reflecting surface carried between the flanges of the finder frame and lying in a plane parallel with the axis of the finder frame and facing said small mirror, sighting means fitted on the finder frame in registry with the semi-reflecting surface and extending in parallelism with the objective axis in the operative position of the finder frame to provide in superposition a view of the scene to be photographed through said semi-transparent reflecting surface and a view of a small section of said scene through a first reflection on the small mirror and a second reflection on the semi-transparent reflecting surface, a projection rigid with each finder frame flange and engaging the groove in the corresponding guide, levers pivotally secured to the guides round a common transverse axis and adapted to move in planes parallel to the said guides and the ends of which face the corresponding ends of the cooperating grooves in the guides, said levers extending on the inside of the grooves with reference to the pivotal axis of the finder frame and elastic means urging each lever into engagement with the projection on the corresponding finder frame flange to hold said projection selectively for the above-mentioned terminal positions of the finder frame inside the ends of the cooperating groove and to lock the finder frame in the corresponding terminal positions.

2. A combined direct view finder and telemeter for photographic cameras provided with means for shifting the objective along its axis, comprising a finder frame including two parallel flanges hingedly secured to the camera to pivot round an axis perpendicular to the objective axis between an operative terminal position and a collapsed terminal position, guides rigid with the camera in planes perpendicular to the last-mentioned axis, provided with arcuate grooves coaxial with said pivotal axis and between which the finder frame flanges are held during the pivoting movement of the finder frame, a small mirror pivotally secured to the camera round an axis adjacent the pivotal axis of the finder frame and parallel therewith, means controlled by the shifting of the objective to produce a slight tilting movement of the small mirror round its axis as a function of the shifting of the objective, a semi-transparent reflecting surface carried between the flanges of the finder frame and lying in a plane parallel with the axis of the finder frame and facing said small mirror, sighting means fitted on the finder frame in registry with the semi-reflecting surface and extending in parallelism with the objective axis in the operative position of the finder frame to provide in superposition a view of the scene to be photographed through said semi-transparent reflecting surface and a view of a small section of said scene through a first reflection on the small mirror and a second reflection on the semi-transparent reflecting surface, a projection rigid with each finder frame flange and engaging the groove in the corresponding guide, levers pivotally secured to the guides round a common transverse axis and adapted to move in planes parallel to the said guides and the ends of which face the corresponding ends of the cooperating grooves in the guides, said levers extending on the inside of the grooves with reference to the pivotal axis of the finder frame, the levers being notched at their inner ends near their pivotal axis and their outer ends being provided with an oblique flat outer surface, and elastic means urging each lever into engagement with the projection on the corresponding finder frame flange to hold said projection selectively in the notch at one end of the lever to positively engage same for the operative position of the finder frame and against the flat outer surface at the other end of the lever for the collapsed position of said finder frame.

3. A combined direct view finder and telemeter for photographic cameras provided with means for shifting the objective along its axis, comprising a finder frame including two parallel flanges hingedly secured to the camera to pivot round an axis perpendicular to the objective axis between an operative terminal position and a collapsed terminal position, guides rigid with the camera in planes perpendicular to the last-mentioned axis, provided with arcuate grooves coaxial with said pivotal axis and between which the finder frame flanges are held during the pivoting movement of the finder frame, a small mirror pivotally secured to the camera round an axis adjacent the pivotal axis of the finder frame and parallel therewith, means controlled by the shifting of the objective to produce a slight tilting movement of the small mirror round its axis as a function of the shifting of the objective, a semi-transparent reflecting surface carried between the flanges of the finder frame and lying in a plane parallel with the axis of the finder frame and facing said small mirror, sighting means fitted on the finder frame in registry with the semi-reflecting surface and extending in parallelism with the objective axis in the operative position of the finder frame to provide in superposition a view of the scene to be photographed through said semi-transparent reflecting surface and a view of a small section of said scene through a first reflection on the small mirror and a second reflection on the semi-transparent reflecting surface, a projection rigid with each finder frame flange and engaging the groove in the corresponding guide, levers pivotally secured to the guides round a common transverse axis and adapted to move in planes parallel to the said guides and the ends of which face the corresponding ends of the cooperating grooves in the guides, said levers extending on the inside of the grooves with reference to the pivotal axis of the finder frame, the end of each lever near the axis thereof being provided with a notch, and springs urging said levers towards said grooves to engage the notches in said levers over the projections on the corresponding finder frame flanges when the finder frame is in its operative position for which the projections face said notches.

References Cited in the file of this patent

UNITED STATES PATENTS

| | | |
|---|---|---|
| 970,443 | Hammond | Sept. 13, 1910 |
| 1,178,475 | Becker | Apr. 4, 1916 |
| 2,127,925 | Leitz | Aug. 23, 1938 |
| 2,191,027 | Ort | Feb. 20, 1940 |